(12) United States Patent
Gunther et al.

(10) Patent No.: US 7,444,524 B2
(45) Date of Patent: Oct. 28, 2008

(54) DYNAMIC VOLTAGE TRANSITIONS

(75) Inventors: Stephen H. Gunther, Beaverton, OR (US); Robert Greiner, Beaverton, OR (US); Matthew M. Ma, Portland, OR (US); Kevin Dai, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 314 days.

(21) Appl. No.: 10/334,966

(22) Filed: Dec. 30, 2002

(65) Prior Publication Data
US 2004/0125514 A1    Jul. 1, 2004

(51) Int. Cl.
*G06F 1/26* (2006.01)
*G06F 1/32* (2006.01)

(52) U.S. Cl. ............... 713/300; 713/310; 713/320; 713/321; 713/322; 713/323; 713/324; 713/330; 713/340

(58) Field of Classification Search ............ 713/300, 713/310, 320–324, 330, 340, 375, 400, 401, 713/500, 501
See application file for complete search history.

(56) References Cited

U.S. PATENT DOCUMENTS

| | | | |
|---|---|---|---|
| 5,692,201 A | 11/1997 | Yato | |
| 5,760,636 A * | 6/1998 | Noble et al. | 327/513 |
| 6,425,086 B1 * | 7/2002 | Clark et al. | 713/322 |
| 6,574,739 B1 * | 6/2003 | Kung et al. | 713/322 |
| 6,889,331 B2 * | 5/2005 | Soerensen et al. | 713/320 |
| 2002/0083356 A1 * | 6/2002 | Dai | 713/322 |
| 2002/0087896 A1 * | 7/2002 | Cline et al. | 713/300 |
| 2002/0109489 A1 | 8/2002 | Shaver et al. | |
| 2002/0116650 A1 * | 8/2002 | Halepete et al. | 713/300 |
| 2003/0065960 A1 * | 4/2003 | Rusu et al. | 713/300 |
| 2004/0103330 A1 * | 5/2004 | Bonnett | 713/322 |
| 2004/0107370 A1 * | 6/2004 | Mosley | 713/300 |
| 2004/0123170 A1 * | 6/2004 | Tschanz et al. | 713/320 |
| 2004/0164782 A1 * | 8/2004 | Zampetti et al. | 327/292 |

FOREIGN PATENT DOCUMENTS

WO    WO 02/17052 A2    2/2002

OTHER PUBLICATIONS

231 USPQ 967.*
Mark C. Johnson et al., "Datapath Scheduling with Multiple Supply Voltages and Level Converters," Proceedings of the 1997 IEEE International Symposium on Circuits and Systems, Hong Kong; pp. 1-20, ACM, Inc., New York, NY, USA.
Diana Marculescu, "Power Efficient Processors Using Multiple Supply Voltages," Submitted to the Workshop on Compilers and Operating Systems for Low Power, in conjunction with PACT 2000, pp. 1-6, USA.
"Korean Patent Application 10-2003-0083907 Office Action Mailed Jun. 30, 2006 and mailed Jul. 21, 2006", 4 pages.

* cited by examiner

*Primary Examiner*—Nitin C. Patel
*Assistant Examiner*—Fahmida Rahman
(74) *Attorney, Agent, or Firm*—Blakely, Sokoloff, Taylor & Zafman LLP

(57) ABSTRACT

The operating voltage of an integrated circuit (e.g., a processor) is changed in response to one or more conditions (e.g., a laptop computer is connected to an AC power source). Both the operating frequency and the operating voltage of the integrated circuit are changed. The voltage regulator providing the operating voltage to the integrated circuit is caused to transition between voltage levels using one or more intermediate steps. The integrated circuit continues to operate in the normal manner both at the new voltage and throughout the voltage transition.

24 Claims, 7 Drawing Sheets

DYNAMIC VOLTAGE TRANSITIONS

TECHNICAL FIELD

The invention relates to integrated circuits. More particularly, the invention relates to a technique for dynamic modification of operating voltage levels.

BACKGROUND

Because energy consumption of a circuit is quadradically dependent on the supply voltage ($E \propto CV_{dd}^2$, where $V_{dd}$ is the supply voltage) to the circuit, moderate reductions in supply voltage can provide significant power savings. As a result, complex integrated circuits, for example, microprocessors, are designed using lower and lower supply voltages. However, one disadvantage of lower supply voltages is generally increased delay times $$(D \propto \frac{V_{dd}}{(V_{dd} - V_T)^\alpha},$$

where $V_T$ is the threshold voltage and $\alpha$ is strongly dependent on the mobility degradation of elections in transistors).

One prior solution is to use higher supply voltages for circuits on a critical path of a processor and a lower voltage for circuits not on the critical path of the processor. Because the circuits not on the critical path of the processor can operate with increased delay times and not detrimentally effect the overall operation of processor, this solution can provide power savings. Further analysis of this solution is provided by D. Marculescu, "Power Efficient Processors Using Multiple Supply Voltages", Workshop on Compilers and Operating Systems for Low Power, 2000 and M. C. Johnson, et al., "Datapath Scheduling with Multiple Supply Voltages and Level Converters", Proceedings of the IEEE International Symposium on Circuits and Systems, 1997 (Hong Kong). However, these solutions provide lower supply voltages (and therefore power savings) only to a portion of the processor.

BRIEF DESCRIPTION OF THE DRAWINGS

The invention is illustrated by way of example, and not by way of limitation, in the figures of the accompanying drawings in which like reference numerals refer to similar elements.

DETAILED DESCRIPTION

Techniques for dynamically changing the operating voltage of an integrated circuit are described. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

The operating voltage of an integrated circuit (e.g., a processor) is changed in response to one or more conditions (e.g., a laptop computer is connected to an AC power source, or the temperature of the integrated circuit has reached a pre-determined maximum target). In one embodiment, as the operating voltage is decreased, the operating frequency is also decreased. The voltage regulator providing the operating voltage to the integrated circuit is caused to transition between voltage levels using one or more intermediate steps. Intermediate steps are used to transition the voltage regulator from the first operating voltage to the second operating voltage because sudden voltage changes can cause noise, feedback, or other undesirable effects. The integrated circuit continues to operate in the normal manner (i.e., the integrated circuit does not change operating modes) both at the new voltage and throughout the voltage transition.

In one embodiment, the voltage ramp rate is dependent upon the capability of the voltage regulator and the environment in which the integrated circuit is operating. It is possible that the ramp down rate is different than the ramp up rate. For example, environments with large decoupling capacitance, or voltage regulators with lower peak current capability, may result in lower ramp rates than environments with lower decoupling capacitance and/or voltage regulators with higher peak current capability. It is also possible that an environment may require different ramp rates with higher operating frequencies than an environment having a lower operating frequency. This is because the peak current demand on the voltage regulator is dependent upon both the operating frequency and the decoupling capacitance that must be charged or discharged during a transition.

Figure 1:
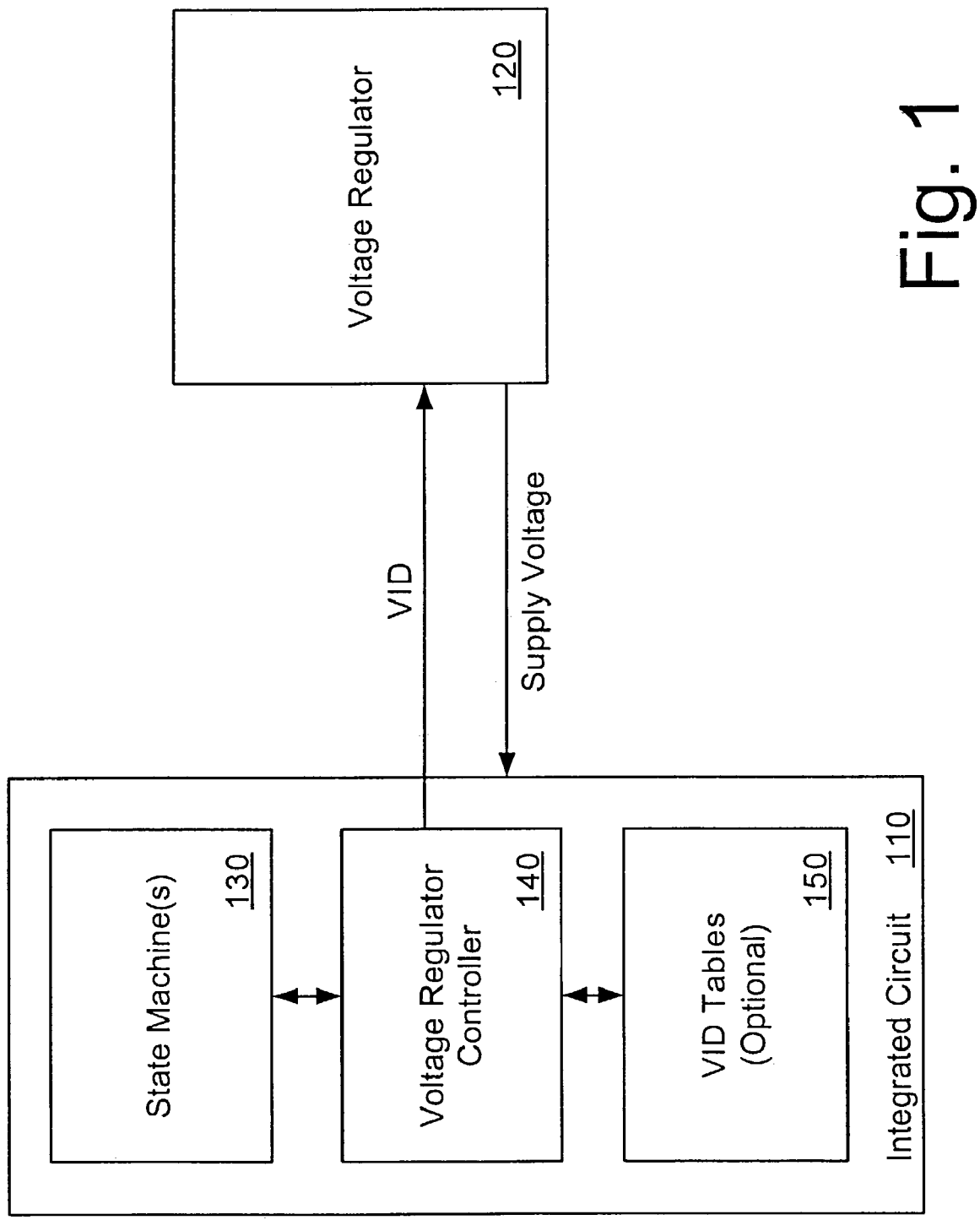
FIG. 1 is a block diagram of one embodiment of an architecture to support dynamic operating voltage transitions for an integrated circuit.

FIG. 1 is a block diagram of one embodiment of an architecture to support dynamic operating voltage transitions for an integrated circuit. Integrated circuit 110 can be any type of integrated circuit that receives a supply voltage from voltage regulator 120, for example, integrated circuit 110 can be a processor.

In one embodiment, integrated circuit 110 includes state machine(s) 130, voltage regulator controller 140, optional VID tables 150 as well as other circuitry, for example, a processor core and/or cache, which is not illustrated in FIG. 1 for reasons of simplicity of description. One or more of these components can also be external to integrated circuit 110. Voltage regulator controller 140 is coupled with state machine(s) 130 and with voltage regulator 120. As described in greater detail below, state machine(s) 130 cause voltage regulator controller 140 to send a supply voltage identifier (VID) signal to voltage regulator 120. Voltage regulator 120 interprets the VID signal and changes the supply voltage provided to integrated circuit 110.

The VID signal can be a single binary signal, or the VID signal can be multiple signals. In one embodiment, the VID signal is communicated over a six-line bus as a six-bit code. The number of bits in the VID code is determined based on, for example, the number of voltage levels that can be provided by voltage regulator 120 and the operating characteristics of voltage regulator 120.

Optional VID tables 150 can be used by voltage regulator controller 140 to translate between codes provided by state machine(s) 130 and the corresponding VID for the type of voltage regulator being used. This allows voltage controller regulator 140 to operate with a greater number of voltage regulators and state machines/control circuits. For example, state machine(s) 130 or voltage regulator controller 140 can receive a code or other signal from a processor core indicating a desired supply voltage. The code can be translated using VID tables 150 to generate the appropriate VID code to cause voltage regulator 120 to provide the desired voltage.

Operating voltage can be changed for many reasons. For example, a mobile computer can operate at a first voltage (and corresponding frequency) when attached to a docking station and at a lower voltage (and corresponding frequency) when removed from the docking station. As described herein, the voltage (and frequency) transition can be accomplished dynamically without changing operational modes during voltage transition. That is, the integrated circuit is not required to enter an inactive state during transitions between operating voltage levels.

As described in greater detail below, integrated circuit 110 transmits VID codes to voltage regulator 120, which transitions to the voltage corresponding to the VID code. State machine(s) 130 can cause voltage regulator controller 140 to selectively transmit VID codes such that both the magnitude and the timing of changes in operating voltage are within parameters appropriate for integrated circuit 110.

Figure 2:
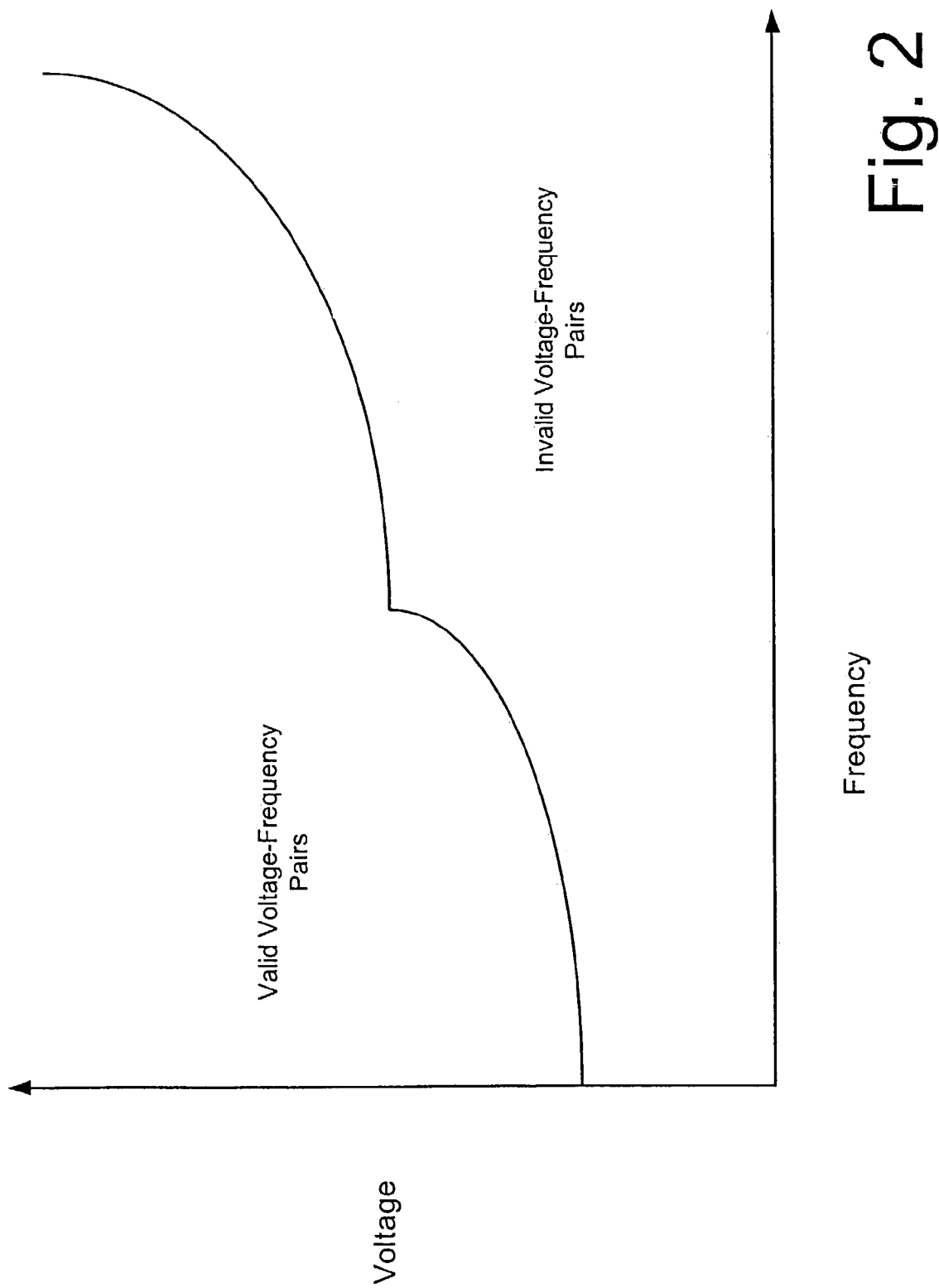
FIG. 2 is one embodiment a voltage versus frequency graph conceptually illustrating valid and invalid voltage/frequency combinations.

FIG. 2 is one embodiment a voltage versus frequency graph conceptually illustrating valid and invalid voltage/frequency combinations. In one embodiment, the acceptable operating range for the integrated circuit can be defined by voltage-frequency pairs. FIG. 2 illustrates the set of valid voltage-frequency pairs and the set of invalid voltage-frequency pairs for an example embodiment.

As will be described in greater detail below, the supply voltages provided by the voltage regulator (in response to VID codes) and the timing of the delivery of the supply voltages can be controlled such that the integrated circuit remains in the acceptable operating range.

Valid voltage-frequency pairs are application specific. Therefore, by providing programmability with both the VID codes to be used and the timing of the VID codes, the techniques described herein can be used for multiple integrated circuit applications.

Figure 3:
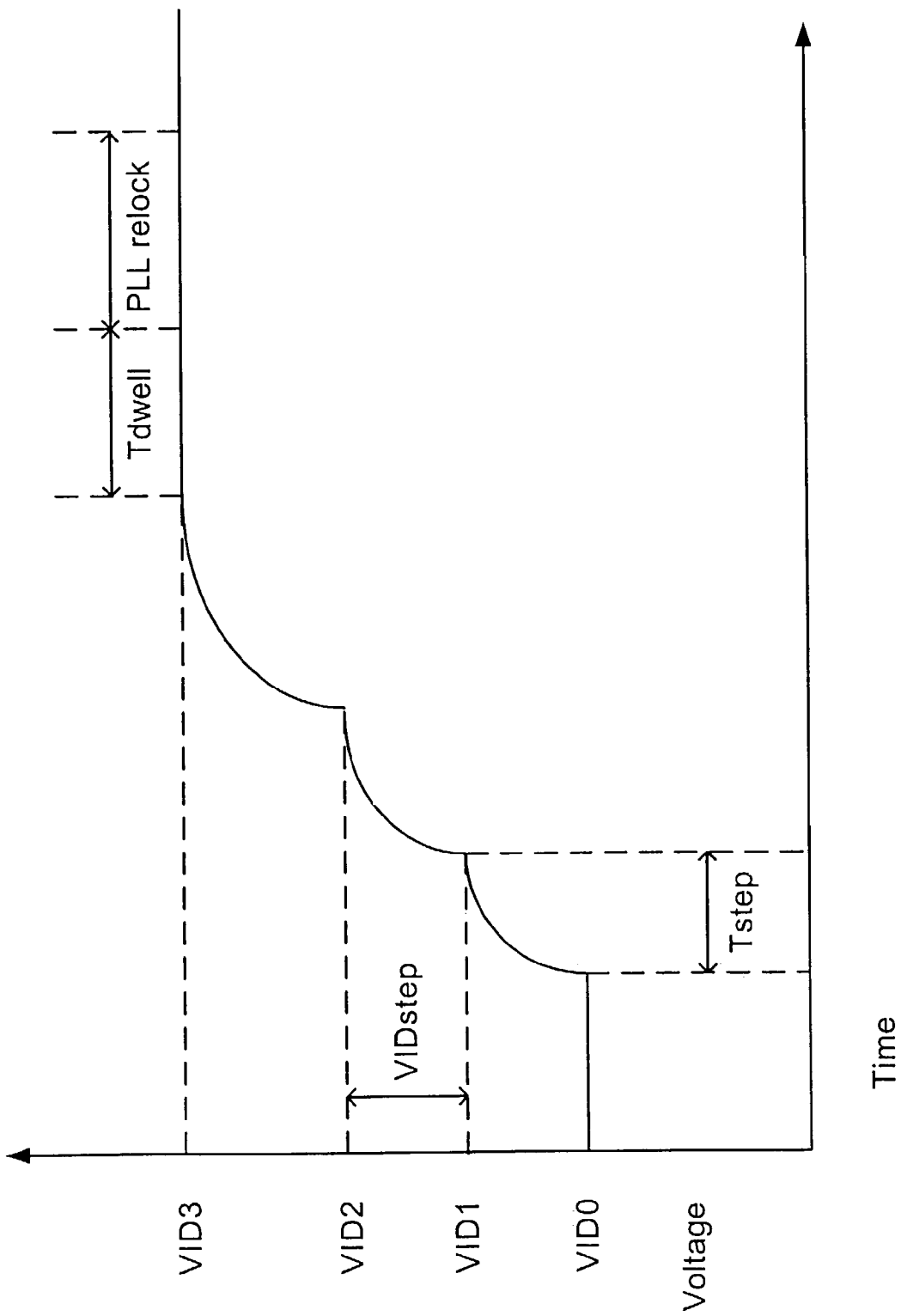
FIG. 3 is a graphical illustration of the conceptual relationship between VID codes and supply voltage for increasing levels of supply voltage.

FIG. 3 is a graphical illustration of the conceptual relationship between VID codes and supply voltage for increasing levels of supply voltage. The horizontal dashed lines represent the target supply voltages corresponding to various VID codes (e.g., VID1, VID2, VID3). The curved solid line represents an example supply voltage level FIG. 3 further illustrates parameters associated with dynamic supply voltage transitions. In one embodiment, the various parameters are programmable. The timing of the various parameters can be determined based on, for example, the capability of the voltage regulator being used.

In the example of FIG. 3, $T_{step}$ represents the time between the issuance of VID codes. $T_{step}$ can be different for each step, or $T_{step}$ can be the same for one or more steps. $VID_{step}$ represents the voltage difference between the voltages corresponding to subsequent VID codes. As with $T_{step}$, $VID_{step}$ can be different for each step or $VID_{step}$ can be the same for one or more steps.

Dwell Time Tdwell is a delay after a desired voltage is reached before which the operating frequency can change. PLL relock time is the time allowed for the phase locked loop (PLL) to lock on to the frequency corresponding to the new voltage.

Figure 4:
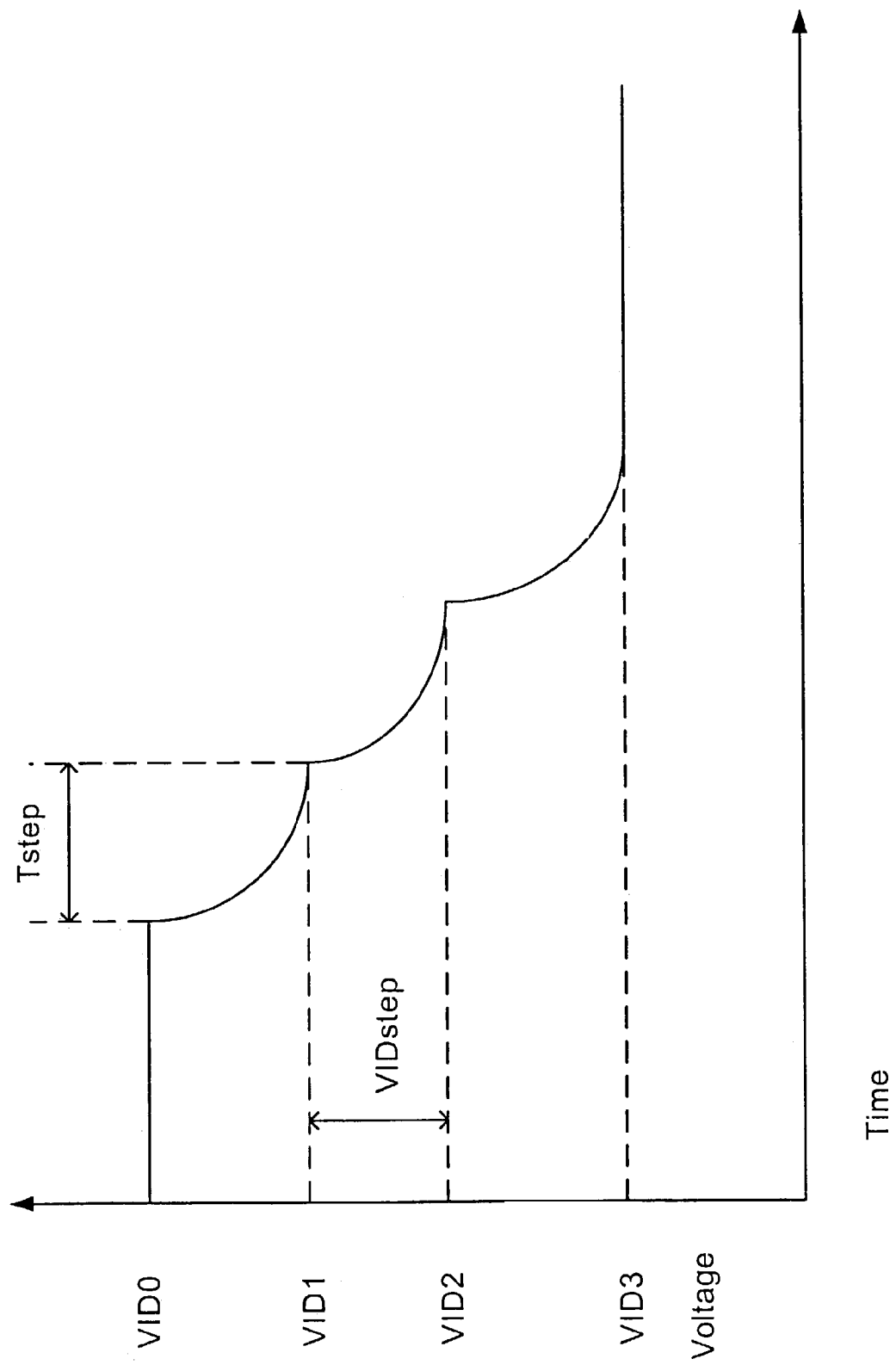
FIG. 4 is a graphical illustration of the conceptual relationship between VID codes and supply voltage for decreasing levels of supply voltage.

FIG. 4 is a graphical illustration of the conceptual relationship between VID codes and supply voltage for decreasing levels of supply voltage. In the example of FIG. 4, $T_{step}$ represents the time between the issuance of VID codes. $T_{step}$ can be different for each step, or $T_{step}$ can be the same for one or more steps. $VID_{step}$ represents the voltage difference between the voltages corresponding to subsequent VID codes. As with $T_{step}$, $VID_{step}$ can be different for each step or $VID_{step}$ can be the same for one or more steps.

Figure 5:
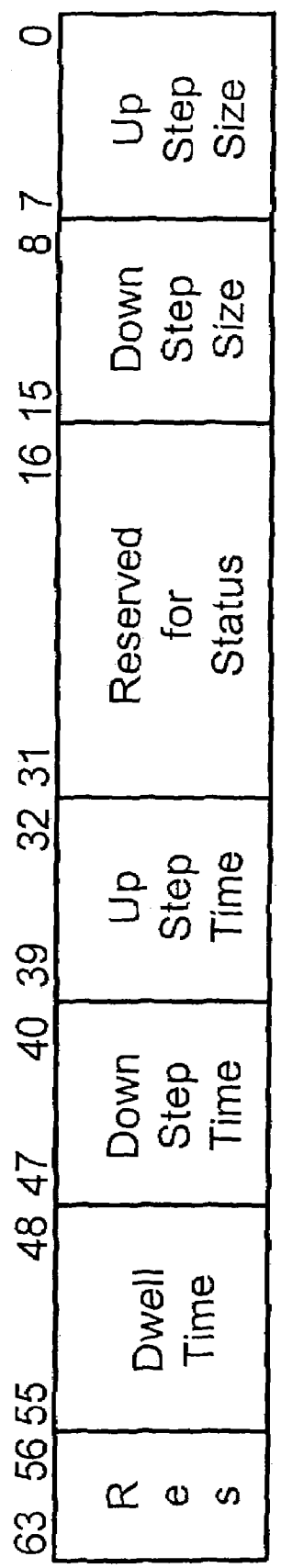
FIG. 5 illustrates one embodiment of a register to store parameters associated with dynamic voltage transitions.

FIG. 5 illustrates one embodiment of a register to store parameters associated with dynamic voltage transitions. The register of FIG. 5 is a single 64-bit register; however, any number of registers can be used to store the parameters described. Also, the number of bits used to store the various parameters can be different than those described with respect to FIG. 5.

In the embodiment illustrated in FIG. 5, bits 56-63 are reserved and not used. Bits 48-55 store the dwell time for a voltage transition. In one embodiment, when the integrated circuit changes to a higher operating voltage, there is an additional delay between the transmission of the final VID code and the time that the integrated circuit changes to the new operating frequency. This time period is defined by the value stored in the Dwell Time field.

The Down Step Time field (bits 40-47) stores a value that controls the time that is inserted between consecutive VID updates when the supply voltage is transitioning to a new, lower level. In one embodiment, a state machine compensates for the selected frequency so that the transition time matches the value in the Down Step Time field.

The Up Step Time field (bits 32-39) stores a value that controls the time that is inserted between consecutive VID updates when the supply voltage is transitioning to a new, higher level. In one embodiment, as with the Down Step Time field, the state machine compensates for the selected frequency so that the transition time matches the value in the Up Step Time field.

In one embodiment, bits 16-31 are reserved to be used for model-specific debug status reporting. During normal operation software does not use this field when reading the register and masks these bits when doing a read-modify-write operation on the register. The reserved status bits are optional and not required to provide dynamic operating voltage transitions.

The Down Step Size field (bits 8-15) determines the amount by which the supply voltage is decreased in a single VID step when the voltage is transitioning to a new, lower level. For example, the field can represent voltage change in increments of 12.5 mV such that a value of 2 in the Down Step Size field causes the next VID code to be 25 mV lower than the current VID code. If the step size is larger than the difference between the current and ending voltage target the target VID code is used.

The Up Step Size field (bits 0-7) determines the amount by which the supply voltage is increased in a single VID step when the voltage is transitioning to a new, higher level. For example, the field can represent voltage change in increments of 15 mV such that a value of 2 in the Up Step Size field causes the next VID code to be 30 mV higher than the current VID code. If the step size is larger than the difference between the current and ending voltage target the target VID code is used.

When the supply voltage is transitioning as a result of the integrated circuit sending VID codes to the voltage regulator, the integrated circuit continues operating as normal. That is, the integrated circuit does not enter a sleep (or other low power) state in order to complete a supply voltage transition. Thus, the integrated circuit can operate (e.g., execute instruction, respond to events) in the normal manner. As a result, the change in current demand with time ($\partial i/\partial t$) is similar as would occur without the voltage transition. As a consequence, the voltage regulator and power delivery network meet the same voltage specifications for normal operation.

Figure 6:
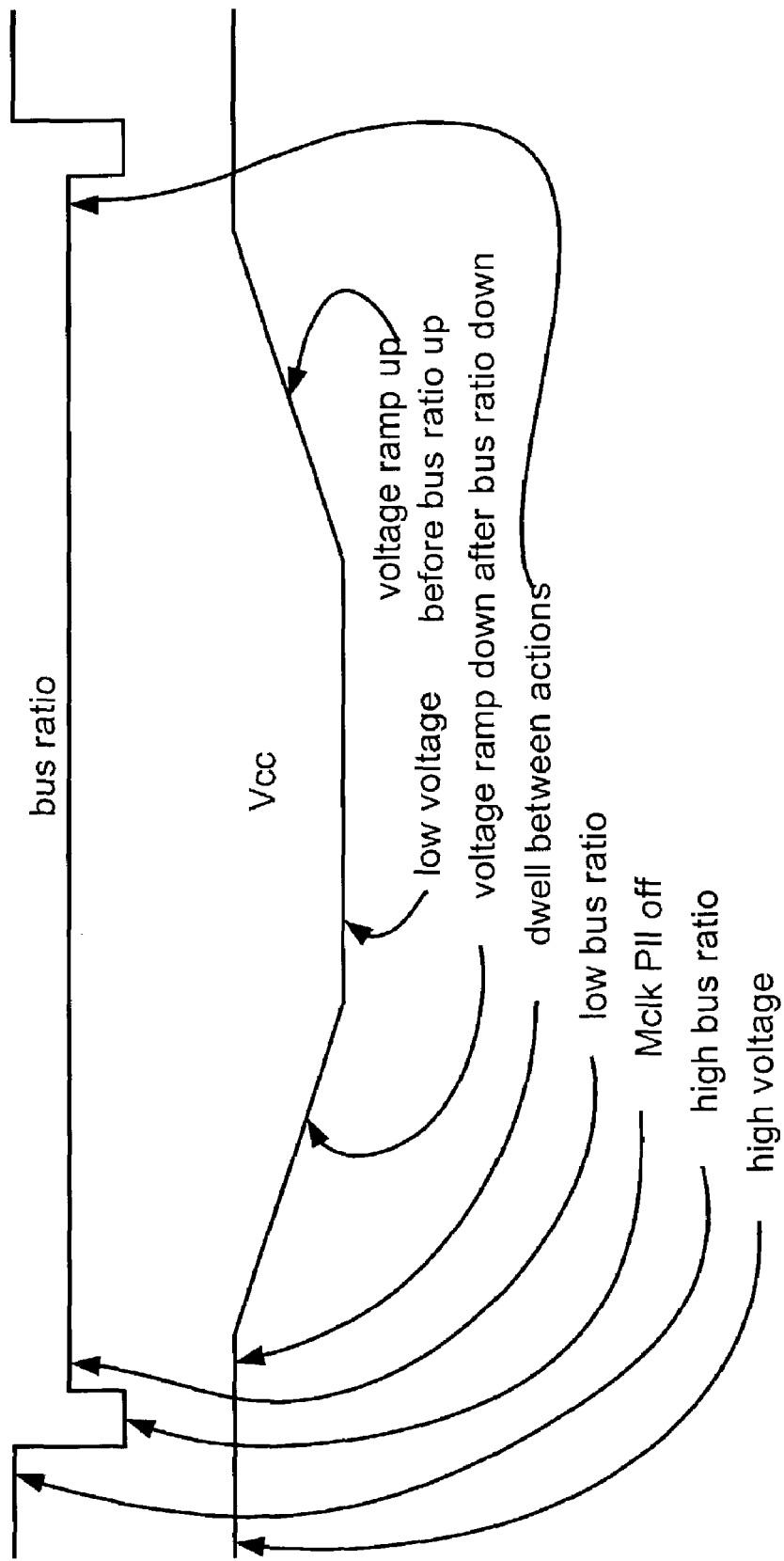
FIG. 6 is a timing diagram of an example dynamic supply voltage transition.

FIG. 6 is a timing diagram of an example dynamic supply voltage transition. The example of FIG. 6 illustrates a transition from a high voltage to a low voltage and back to the high voltage. The bus ratio (or clock frequency) is decreased for the lower operating voltage and increased after the transition back to the high supply voltage level.

Operation begins with a high supply voltage and a high bus ratio (clock frequency). The bus ratio is decreased to the low bus ratio that corresponds to the lower supply voltage to be used. In one embodiment, the processor core frequency may drop below (or possibly stop) the corresponding frequency of the bus ratio during PLL locking to the new bus ratio.

After the bus ratio transition, the supply voltage is ramped down to the low supply voltage and the integrated circuit operates with the low supply voltage and the low bus ratio. After a period of time operating at the lower supply voltage and in response to a predetermined event (e.g., a change in operating conditions) the supply voltage is increased to the high supply voltage level. As period of time determined by the dwell time after the voltage transition is complete, the bus ratio transitions from the low bus ratio to the high bus ratio.

Figure 7:
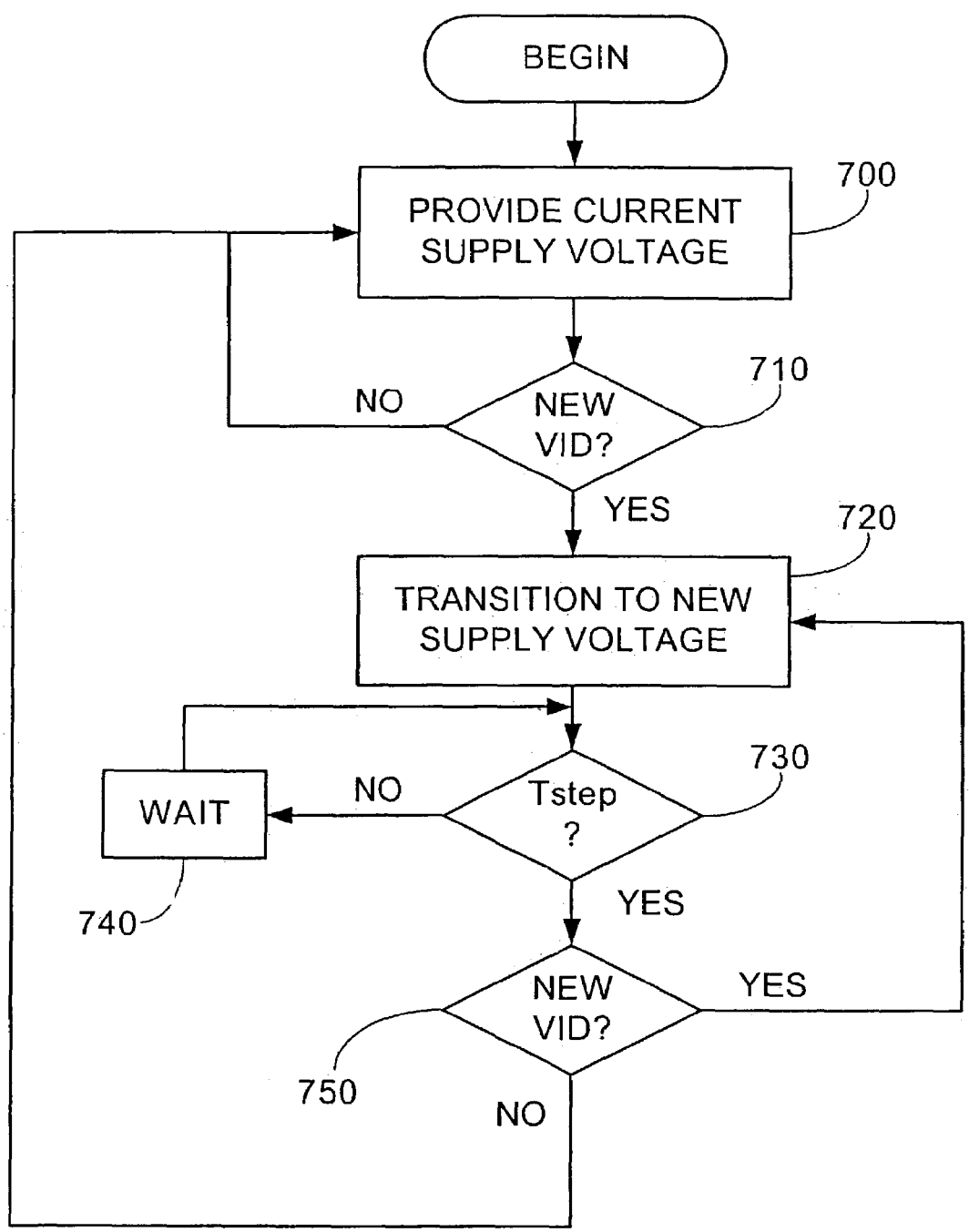
FIG. 7 is a flow diagram of one embodiment of a dynamic transition of supply voltage.

FIG. 7 is a flow diagram of one embodiment of a dynamic transition of supply voltage. A current supply voltage is provided, 700. The current supply voltage can be an initial startup supply voltage level or the current supply voltage can be a selected voltage level that has been selected using VID codes. The current supply voltage is provided until a new VID code is received, 710.

When a new VID code is received, 710, the system transitions to a new supply voltage as indicated by the new VID code, 720. In one embodiment, the VID code is transmitted from the integrated circuit (e.g., a processor) receiving the supply voltage to a voltage regulator providing the voltage to the integrated circuit. The voltage regulator interprets the VID codes and provides the voltage level corresponding to the VID code received.

If the time period corresponding to $T_{step}$ has not passed, 730, the system waits, 740. When the time period of $T_{step}$ has passed, 730, a new VID code can be processed, 750. If a new VID code is received, 750, the voltage regulator can transition to the voltage corresponding to the new VID code as described above. If a new VID code is not received, 750, the voltage regulator continues to provide the new supply voltage, which is now the current supply voltage, 700.

In the foregoing specification, the invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense.

What is claimed is:

1. A method comprising:
    storing voltage step information for each supply voltage level for a plurality of supply voltage levels in separate memory locations in a memory, wherein the memory locations for the respective voltage step information of each supply voltage level storing
        a respective first step voltage for a step increase in voltage from the respective each supply voltage level, and
        a respective second step voltage for a step decrease in voltage from the respective each supply voltage level;
    operating an integrated circuit at a first supply voltage level in the plurality of supply voltage levels;
    determining a second supply voltage level to be provided to the integrated circuit based on the respective step voltage information of the first supply voltage level;
    transmitting, from the integrated circuit to a voltage regulator, an indication of the determined second supply voltage level to be provided to the integrated circuit;
    receiving the second supply voltage level from the voltage regulator; and
    operating the integrated circuit at the second supply voltage level.

2. The method of claim 1, wherein one of the first step voltage and the second step voltage of the first supply voltage level represents a size of a voltage transition from the first supply voltage level.

3. The method of claim 1, wherein the memory locations for the respective voltage step information of each supply voltage level further storing voltage step time information indicating a time of a transition from the each supply voltage level.

4. The method of claim 3, wherein indicating the time of the transition from the each supply voltage level includes indicating a required minimum time duration of operating at the each supply voltage level before an indication of a supply voltage level other than the each supply voltage level can be transmitted.

5. The method of claim 1, wherein the second supply voltage level is in the plurality of supply voltage levels, the method further comprising:
    transmitting, from the integrated circuit to the voltage regulator, an indication of a third supply voltage level to be provided to the integrated circuit, the transmitting based on the voltage step information stored in the respective memory location for the second supply voltage level;
    receiving the third supply voltage level from the voltage regulator; and
    operating the integrated circuit at the third supply voltage level.

6. A method comprising:
    providing, with a voltage regulator, a first supply voltage level to an integrated circuit;
    storing voltage step information for each supply voltage level for a plurality of supply voltage levels in separate memory locations in a memory, wherein the memory locations for the respective voltage step information of each supply voltage level storing
        a respective first step voltage for a step increase in voltage from the respective each supply voltage level, and
        a respective second step voltage for a step decrease in voltage from the respective each supply voltage level;
    determining a second supply voltage level to be provided to the integrated circuit based on the respective step voltage information of the first supply voltage level;

receiving at the voltage regulator voltage step information indicating the determined second supply voltage level to be provided to the integrated circuit by the voltage regulator;

providing the second supply voltage level to the integrated circuit with the voltage regulator.

7. The method of claim 6, wherein one of the first step voltage and the second step voltage of the first supply voltage level represents a size of a voltage transition from the first supply voltage level.

8. The method of claim 6, wherein the memory locations for the respective voltage step information of each supply voltage level further storing voltage step time information indicating a time of a transition from the each supply voltage level.

9. The method of claim 8, wherein indicating the time of the transition from the each supply voltage level includes indicating a required minimum time duration of operating at the each supply voltage level before an indication of a supply voltage level other than the each supply voltage level can be transmitted.

10. The method of claim 6, wherein the second supply voltage level is in the plurality of supply voltage levels, the method further comprising:

receiving at the voltage regulator an indication of a third supply voltage level to be provided to the integrated circuit by the voltage regulator, the received indication based on the voltage step information stored in the respective memory location for the second supply voltage level;

providing the third supply voltage level to the integrated circuit with the voltage regulator.

11. An apparatus comprising:

a memory to store voltage step information for each supply voltage level for a plurality of supply voltage levels in separate memory locations in the memory, wherein the memory locations for the respective voltage step information of each supply voltage level storing a respective first step voltage for a step increase in voltage from the respective each supply voltage level, and a respective second step voltage for a step decrease in voltage from the respective each supply voltage level;

an integrated circuit having a control circuit and a voltage regulator controller coupled to the control circuit and to the memory, the voltage regulator controller to determine a second supply voltage level to be provided to the integrated circuit based on the respective step voltage information of a first supply voltage level of the plurality of supply voltage levels;

a voltage regulator coupled to the voltage regulator controller, wherein the voltage regulator provides the first supply voltage level to the integrated circuit and further wherein the voltage regulator controller transmits to the voltage regulator an indication of the determined second supply voltage level to be provided to the integrated circuit, and further wherein the voltage regulator provides the second supply voltage level to the integrated circuit in response to receiving the indication.

12. The apparatus of claim 11, wherein one of the first step voltage and the second step voltage of the first supply voltage level represents a size of a voltage transition from the first supply voltage level.

13. The apparatus of claim 11, wherein the memory locations for the respective voltage step information of each supply voltage level further storing voltage step time information indicating a time of a transition from the each supply voltage level.

14. The apparatus of claim 13, wherein indicating the time of the transition from the each supply voltage level includes indicating a required minimum time duration of operating at the each supply voltage level before an indication of a supply voltage level other than the each supply voltage level can be transmitted.

15. The apparatus of claim 11, wherein the control circuit comprises one or more state machines.

16. The apparatus of claim 11, wherein the integrated circuit comprises a processor.

17. An apparatus comprising:

a memory to store voltage step information for each supply voltage level for a plurality of supply voltage levels in separate memory locations, wherein the memory locations for the respective voltage step information of each supply voltage level storing a respective first step voltage for a step increase in voltage from the respective each supply voltage level, and a respective second step voltage for a step decrease in voltage from the respective each supply voltage level, means for operating an integrated circuit at a first supply voltage level in the plurality of supply voltage levels;

means for determining a second supply voltage level to be provided to the integrated circuit based on the respective step voltage information of the first supply voltage level;

means for transmitting, from the integrated circuit to a voltage regulator, an indication of the determined second supply voltage level to be provided to the integrated circuit;

means for receiving the second supply voltage level from the voltage regulator; and means for operating the integrated circuit at the second supply voltage level.

18. The method of claim 17, wherein one of the first step voltage and the second step voltage of the first supply voltage level represents a size of a voltage transition from the first voltage level.

19. The method of claim 17, wherein the memory locations for the respective voltage step information of each supply voltage level further storing voltage step time information indicating a time of a transition from the each supply voltage level.

20. The method of claim 19, wherein indicating the time of the transition from the each supply voltage level includes indicating a required minimum time duration of operating at the each supply voltage level before an indication of a supply voltage level other than the each supply voltage level can be transmitted.

21. An apparatus comprising:

a memory to store voltage step information for each supply voltage level for a plurality of supply voltage levels in separate memory locations, wherein the memory locations for the respective voltage step information of each supply voltage level storing a respective first step voltage for a step increase in voltage from the respective each supply voltage level, and a respective second step voltage for a step decrease in voltage from the respective each supply voltage level, a means for providing, with a voltage regulator, a first supply voltage level to an integrated circuit;

means for determining a second supply voltage level to be provided to the integrated circuit based on the respective step voltage information of the first supply voltage level;

means for receiving, from the integrated circuit, voltage step information indicating the determined second supply voltage level to be provided to the integrated circuit by the voltage regulator;

a means for providing the second supply voltage level to the integrated circuit with the voltage regulator.

22. The apparatus of claim 21, wherein one of the first step voltage and the second step voltage of the first supply voltage level represents a size of a voltage transition from the first voltage level.

23. The apparatus of claim 21, wherein the memory locations for the respective voltage step information of each supply voltage level further storing voltage step time information indicating a time of a transition from the each supply voltage level.

24. The apparatus of claim 23, wherein indicating the time of the transition from the each supply voltage level includes indicating a required minimum time duration of operating at the each supply voltage level before an indication of a supply voltage level other than the each supply voltage level can be transmitted.

* * * * *